United States Patent Office 3,422,150
Patented Jan. 14, 1969

3,422,150
PROCESS FOR THE PREPARATION
OF α-DITHIOLS
Bernard H. Pflugfelder, Artix, France, assignor to
Ste Anonyme dite: Societe Nationale des Petroles
d'Aquitaine, Courbevoie, France, a corporation of
France
No Drawing. Filed Dec. 15, 1965, Ser. No. 514,143
Claims priority, application France, Dec. 23, 1964,
999,702
U.S. Cl. 260—609     8 Claims
Int. Cl. C07c 149/06

ABSTRACT OF THE DISCLOSURE

An α-dithiol is produced by introducing ethylene monothiocarbonate or an alkylated derivative thereof into an aqueous alkaline solution, saturated with $H_2S$, to effect exothermic reaction which results in the opening of the oxathiolane ring with formation of a basic double salt which is then acidified so as to produce the dithiol product.

---

The present invention relates to a novel process for the preparation of α-dithiols, of the general formula:

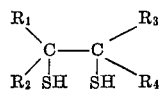

In this formula $R_1$, $R_2$, $R_3$, $R_4$ may be hydrocarbon radicals which are the same or different. They may be separately or entirely hydrogen. This method is particularly convenient for the preparation of α-dithiols, in which the radicals $R_1$, $R_2$, $R_3$, $R_4$ are carbon chains containing from 1 to 3 atoms of carbon. It applies particularly to the preparation of ethane dithol and of 1–2 propane dithiol.

Dithiols have a certain industrial interest; they may be intended for employment in the same way as 1–2 glycols. They replace the dialcohols in polymerisation reactions; they serve as addition products on double bonds. They serve as raw materials for the synthesis of insecticides and pesticides.

It is known to prepare α-dithiols by the reaction of the halogen derivative corresponding with thiourea. There is obtained as an intermediate a diisothiouronium salt which is hydrolysed in an alkaline medium to obtain the dimercaptide. This dimercaptide is then acidified to obtain the dithiol.

This method is, however, long, and difficult to effect on an industrial scale. Furthermore, α-dithiols are not exclusively obtained but a considerable proportion of trithioglycol, which reduces furthermore the yield of dithiol.

A variation of this method consists of replacing the thiourea with an alcoholic solution of sodium or potassium hydrosulphide, but the same difficulties remain.

It is also known to prepare ethane dithiol from ethyl 2 mercaptoethylcarbonate. However, this process is of little interest. The raw material is a product difficult to obtain and expensive. The prior art indicates no generalisation of this process which only seems to be applicable to the preparation of ethane dithiol.

It is an object of the present invention to provide an improved process for the preparation of different α-dithiols of the general formula represented above, from easily available materials, the 2-one, 1–3 oxathiolanes of which the preparation has been described in a previous patent.

The 2-one, 1–3 oxathiolanes also currently called monothiocarbonates have for their general formula:

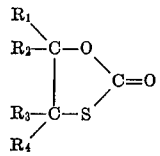

in which $R_1$, $R_2$, $R_3$, $R_4$ may be the same or different hydrocarbon radicals. They may be separately or entirely hydrogen.

According to the present invention there is provided a process for the preparation of α-dithiols comprising condensing a 2-one 1–3 oxathiolane in an aqueous alkaline solution saturated with $H_2S$ in order to obtain first an alkaline double salt and acidifying with salt so as to reduce the corresponding dithiol.

The saturation of the ammoniacal solution with hydrogen sulphide can be carried out at temperatures between $-10°$ and $50°$ C., and epsecially between 0 and $10°$ C. The condensation of the oxathiolane is exothermic, the temperature is allowed to rise around $35-40°$ C. after its introduction into the basic hydrogen sulphide solution.

In the course of this condensation it is possible to use the known bases, however, the best results are obtained with ammonia. The principal condition is that this base renders the reaction medium sufficiently alkaline to facilitate on the one hand the opening of the oxathiolane ring, and to form on the other hand an acid sulphide with the hydrogen sulphide. The basic double salt obtained is treated with an acid to give the α-dithiol. All acids are suitable for this step, but sulphuric acid is preferably used, since the ammonium sulphate formed is more soluble in the reaction medium than the other ammonium salts.

The scheme of the reaction is as follows:

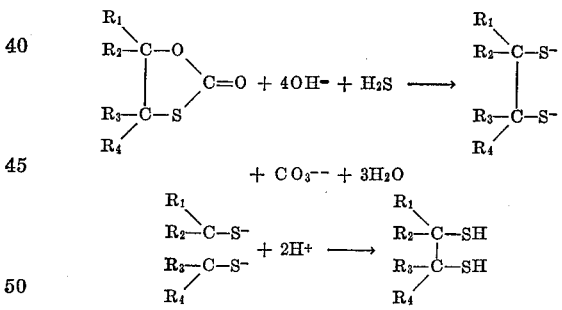

The yields of dithiol easily reach about 62% with respect to the oxathiolane.

In order to illustrate the invention, several embodiments will now be described by way of nonlimiting examples.

Example 1

In a 1 l. Grignard apparatus, provided with a stirrer with a gas dip tube, with a refrigerant connected to a coil, then with a graduated bulb, there is introduced 465 cm.³ (5 moles) of an ammoniacal solution at 22° Bé. This solution is saturated with a current of $H_2S$, at a temperature between 0 and 10° C.

Continuing to bubble the hydrogen sulphide through, with stirring, there are progressively introduced 104 g. (1 mole) of 2-one 1-3 oxathiolane. The flow of $H_2S$ is discontinued. Stirring is continued and the temperature is allowed to rise to 35–40° C. It is then re-cooled to $-5°$ C. and acidified to pH 2 with a 1 to 1 solution of sulphuric acid (the pH control may be effected by observation of the effervescing which is caused by the introduction of the acid. This effervescence being due to the release of $CO_2$).

During this neutralisation, the temperature must not be allowed to exceed 10 to 15° C. The liquid is decanted and the fraction of ethane dithiol distilled off which passes at 50° C./21 mm. Hg or 146° C./760 mm.

The yield of dithiol is 62% with respect to the oxathiolane. The characteristics of the ethane dithiol are $n_D{}^{25}$ 1.5557; density$_{25}$ 1.118.

Examples 2, 3, 4, 5, 6, 7

Using the same apparatus, several parameters may be varied: molar ratio $NH_4OH$/oxathiolane, time of passage of the $H_2S$ after the introduction of the oxathiolane, time of stirring, temperature. The results are recorded in the following table.

| Experiments | Mol. ratio $NH_4OH$/ oxathiolane | Time of passing $H_2S$ after introduction of oxathiolane in hours | Time of agitation in hours | T.,° C. during agitation | Yield in dithiol oxathiolane |
|---|---|---|---|---|---|
| 1 | 5 | 0 | 4 | Room | 62 |
| 2 | 3 | 0 | 4 | Room | 62 |
| 3 | 3 | 1 | 4 | Room | 60 |
| 4 | 5 | 1 | 4 | Room | 59 |
| 5 | 3 | 0 | 8 | Room | 61 |
| 6 | 3 | 0 | 4 | 50 | 54 |
| 7 | 3 | 6 | 6 | 50 | 49 |

This table shows that the molar ratio $NH_4OH$/oxathiolane of 3 gives the best yield, that it is not necessary to prolong the passage of the hydrogen sulphide after the introduction of the oxathiolane, and that the temperatures approach room temperature, which are those to be recommended.

Example 8

Using the same equipment as in Example 1, there is introduced into the reactor 279 cm.$^3$ (3 moles) of an ammoniacal solution at 22° Bé. This solution is saturated by a current of $H_2S$ at a temperature between 0 and 10° C. As in Example 1 there are introduced progressively 1 mole (118 g.) of 5 methyl 2-one 1-3 oxathiolane. The subsequent operations are the same as in Example 1 (except for the time of agitation equal to three hours), the 1-2 propane dithiol being collected with a yield of 63%, in the fraction distilling at 60°/28 mm. Hg; this product presenting the following characteristics: $n_D{}^{25}$ 1.5219, density$_{25}$ 1.052.

Example 9

Experiment 1 is carried out replacing the ammonia by an aqueous solution of sodium carbonate of normality 10 N. The yields of ethane dithiol were only 25%.

I claim:
1. A process for the preparation of an α-dithiol of the formula

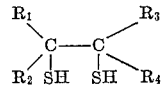

wherein $R_1$, $R_2$, $R_3$ and $R_4$ each are selected from the group consisting of hydrogen and alkyl of from 1 to 3 carbon atoms, comprising reacting a 2-one 1-3 oxatholane of the formula

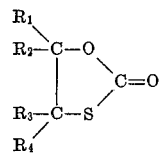

wherein $R_1$, $R_2$, $R_3$ and $R_4$ are as defined above, with an aqueous alkaline solution saturated with $H_2S$ to open the oxathiolane ring and form an alkaline double salt, and acidifying said double salt so as to produce said dithiol.

2. The process of claim 1 wherein the reaction is conducted at a temperature below about 50° C.

3. The process of claim 1 wheren $R_1$, $R_2$, $R_3$ and $R_4$ are hydrogen.

4. The process of claim 1 wherein the selected 2-one 1-3 oxathiolane is 5-methyl 2-one 1-3 oxathiolane.

5. The process of claim 1 wherein the acid utilized to acidify the double salt is sulfuric acid.

6. The process of claim 1 wherein the alkaline solution is a solution of $NH_4OH$ saturated with $H_2S$.

7. The process of claim 6 wherein the molecular ratio of $NH_4OH$ to oxathiolane is in the range of about 3 to 5.

8. The process of claim 6 wherein the saturation of the $NH_4OH$ solution with $H_2S$ is performed at a temperature between about 0 and 10° C., the oxathiolane is introduced into the saturated solution, and the temperature is permitted to rise no higher than about 50° C.

References Cited

UNITED STATES PATENTS 2,432,797  12/1947  Peters et al. _____ 260—609 XR

OTHER REFERENCES

Reid, "Org. Chem. Bival. Sul." vol. pp. 41, 42, 1958.

CHARLES B. PARKER, *Primary Examiner.*

D. R. PHILLIPS, *Assistant Examiner.*